US010189061B2

(12) United States Patent
Fleishman et al.

(10) Patent No.: US 10,189,061 B2
(45) Date of Patent: Jan. 29, 2019

(54) MANUFACTURED COMPOSITE HAVING SYNTHETIC VEGETATION AND IMPERMEABLE GEOMEMBRANE, AND CAPPING SYSTEM USING SAME

(71) Applicant: Lite Earth LLC, Austin, TX (US)

(72) Inventors: Charles Doyle Fleishman, Round Rock, TX (US); John Thomas Baize, Round Rock, TX (US)

(73) Assignee: Lite Earth LLC, Austin, TX (US)

(*) Notice: Subject to any disclaimer, the term of this patent is extended or adjusted under 35 U.S.C. 154(b) by 83 days.

(21) Appl. No.: 15/436,562

(22) Filed: Feb. 17, 2017

(65) Prior Publication Data
US 2017/0232487 A1    Aug. 17, 2017

Related U.S. Application Data

(63) Continuation of application No. 14/838,221, filed on Aug. 27, 2015, now Pat. No. 9,610,620, which is a
(Continued)

(51) Int. Cl.
*E02D 3/00* (2006.01)
*B09B 1/00* (2006.01)
(Continued)

(52) U.S. Cl.
CPC ............. *B09B 1/004* (2013.01); *B32B 5/024* (2013.01); *B32B 7/12* (2013.01); *B32B 25/10* (2013.01); *B32B 25/16* (2013.01); *B32B 37/10* (2013.01); *B32B 37/1207* (2013.01); *B32B 37/182* (2013.01); *D05C 17/026* (2013.01); *E01C 13/08* (2013.01); *E02D 3/00* (2013.01); *E02D 17/202* (2013.01); *B32B 2037/1215* (2013.01); *B32B 2250/02* (2013.01); *B32B 2262/0253* (2013.01); *B32B 2305/22* (2013.01);
(Continued)

(58) Field of Classification Search
CPC ..... B29C 66/1122; B29C 66/14; E01C 13/08; B09B 1/004; B32B 5/024; B32B 7/12
USPC .......... 405/270, 302.6, 302.7, 129.75, 129.8, 405/129.9; 428/33, 57–58, 88–89, 428/192–193
See application file for complete search history.

(56) References Cited

U.S. PATENT DOCUMENTS 5,258,217 A   11/1993 Lewis
7,682,105 B2   3/2010 Ayers et al.
(Continued)

*Primary Examiner* — Anna M Momper
*Assistant Examiner* — Patrick F Lambe
(74) *Attorney, Agent, or Firm* — David O. Simmons; IVC Patent Agency

(57) ABSTRACT

A manufactured composite comprising synthetic turf and impermeable geomembrane is used in a single-layer capping system as the single layer to provide permanent, impermeable and functional aesthetic cover for land reclamation. During installation of composite pieces at a job site, an edge portion of a tufted section of a second composite piece is overlaid onto an edge untufted section of the first composite piece already laid and anchored over foundation soil to form a reinforced overlapping seam, through which the two composite pieces are physically and permanently joined together. As composite pieces are joined together, the continuity of synthetic grass and the continuity of impermeability are extended and realized over the entire site to form permanent, impermeable and functional aesthetic cover for land reclamation.

18 Claims, 7 Drawing Sheets

Related U.S. Application Data continuation of application No. 13/747,460, filed on Jan. 22, 2013, now Pat. No. 9,151,009.

(60) Provisional application No. 61/594,962, filed on Feb. 3, 2012.

(51) Int. Cl.
*B32B 5/02* (2006.01)
*B32B 7/12* (2006.01)
*B32B 25/10* (2006.01)
*B32B 25/16* (2006.01)
*B32B 37/10* (2006.01)
*B32B 37/12* (2006.01)
*B32B 37/18* (2006.01)
*D05C 17/02* (2006.01)
*E01C 13/08* (2006.01)
*E02D 17/20* (2006.01)
*E02D 5/80* (2006.01)

(52) U.S. Cl.
CPC ... *B32B 2307/31* (2013.01); *B32B 2307/7242* (2013.01); *B32B 2307/7265* (2013.01); *B32B 2323/04* (2013.01); *B32B 2323/10* (2013.01); *B32B 2323/16* (2013.01); *E02D 5/80* (2013.01); *E02D 2300/0004* (2013.01); *E02D 2300/0017* (2013.01); *E02D 2300/0025* (2013.01); *E02D 2300/0085* (2013.01)

(56) References Cited

U.S. PATENT DOCUMENTS

| | | |
|---|---|---|
| 79,508,782 | 5/2011 | Carepenter |
| 8,240,959 B1 | 8/2012 | Rhoades et al. |
| 2009/0214841 A1 | 8/2009 | Tippins | ved
MANUFACTURED COMPOSITE HAVING SYNTHETIC VEGETATION AND IMPERMEABLE GEOMEMBRANE, AND CAPPING SYSTEM USING SAME

CROSS-REFERENCE TO RELATED APPLICATIONS

This continuation patent application claims priority from co-pending U.S. Non-Provisional patent application Ser. No. 14/838,221, filed 27 Aug. 2015, entitled "MANUFACTURED COMPOSITE HAVING SYNTHETIC VEGETATION AND IMPERMEABLE GEOMEMBRANE, AND CAPPING SYSTEM USING SAME", having a common applicant herewith and being incorporated herein in its entirety by reference.

U.S. Non-Provisional patent application Ser. No. 14/838,221 filed 27 Aug. 2015 is a continuation patent application and claims priority from co-pending U.S. Non-Provisional patent application Ser. No. 13/747,460, filed 22 Jan. 2013, entitled "MANUFACTURED COMPOSITE HAVING SYNTHETIC VEGETATION AND IMPERMEABLE GEOMEMBRANE, AND CAPPING SYSTEM USING SAME", having a common applicant herewith and being incorporated herein in its entirety by reference.

U.S. Non-Provisional patent application Ser. No. 13/747,460 filed 22 Jan. 2013, entitled "MANUFACTURED COMPOSITE HAVING SYNTHETIC VEGETATION AND IMPERMEABLE GEOMEMBRANE, AND CAPPING SYSTEM USING SAME", now U.S. Pat. No. 9,151,009, claims priority from U.S. Provisional Patent Application Ser. No. 61/594,962, filed 3 Feb. 2012, entitled "An Anchored Synthetic Vegetation and Geo-membrane Manufactured Composite for Final Capping and Reclamation", having a common applicant herewith and being incorporated herein in its entirety by reference.

TECHNICAL FIELD

The present disclosure generally relates to a manufacture used by a capping system for providing impermeable cover for land reclamation, and more particularly relates to a manufactured composite having synthetic grass and impermeable geo-membrane, as well as a capping system using the manufactured composite to provide permanent, impermeable and functional aesthetic cover for land reclamation.

DESCRIPTION OF THE RELATED ART

Synthetic turf has been extensively used not only for outdoor and indoor sports venues, but also in residential and a wide variety of commercial landscape applications, particularly in arid locations and/or regions where maintenance and water costs have risen. Before the emergence and wide use of synthetic turf, a typical capping system for land reclamation used, inter alia, natural grass, multiple layers of soil, synthetic drainage components and a layer of impermeable thermoplastic geomembrane (such as HDPE or LLDPE liners), to cap the waste there-below. With the advancement of synthetic turf over the past 50 years, capping systems have recently advanced to use, inter alia, synthetic turf and sand infill, rather than the previously used natural grass and top soil, along with separate layers of synthetic drainage components and impermeable thermoplastic geo-membrane liners.

U.S. Pat. No. 7,682,105 (hereinafter referred to as "the '105 patent") discloses such a conventional synthetic grass capping system, which is illustrated in FIGS. 1A and 1B. As shown, capping system 100 uses separate layers. The top layer is synthetic turf formed of artificial grass 103 and geotextiles 104. A sand layer 105 of about 0.5 to about 1.0 inches is placed as infill of the synthetic turf to ballast the material and protect the system against wind uplift. Below geotextiles 104 of the synthetic turf is an impermeable LLDPE geomembrane 102 (which is also referred to as "Super GripNet" using the trademark of AGRU America, Inc.) having a series of spaced studs attached to the upside thereof and a series of spikes attached to the underside thereof. As disclosed in the '105 patent, the series of studs are incorporated in the impermeable liner part of LLDPE geomembrane 102 to form synthetic drainage components. Impermeable LLDPE geomembrane 102 covers foundation soil (also referred to as "intermediate soil cover") 101, which caps and seal waste 108 situated there-below. In some conventional synthetic grass capping systems, there may be a gas collection layer (not shown) placed between thermoplastic geomembrane 102 and foundation soil 101.

Such conventional synthetic grass capping systems share a few common characteristics. First, such capping systems, as exemplified in FIGS. 1A and 1B by the one disclosed in the '105 patent, all require multiple distinct and separate layers each requiring a distinct and separate installation. For example, synthetic turf, sand infill and thermoplastic geomembrane are separate layers each requiring distinct and separate installations.

Next, such conventional synthetic grass capping systems, especially when being implemented on slopes, rely on heavy sand infill for anchoring against wind uplift. This is quite evident for capping system 100 of the '105 patent. In particular, capping system 100 prefers a sand layer of about 0.5 to about 1.0 inches (placed as infill), which, according to the '105 patent, produces a weight of about 5 to about 10 pounds per square foot, to ballast the material and protect capping system 100 against wind uplift. Moreover, as extensively detailed in the '105 patent, capping system 100 at least partly relies on the friction between the sand infill and the artificial grass layer to resist sliding failure when the capping system is implemented along steep slopes. Thus, having sand infill is essential for conventional synthetic grass capping systems like the capping system 100 disclosed in the '105 patent.

Further, in addition to basic synthetic turf and thermoplastic geomembrane liners, such conventional synthetic grass capping systems also require some forms of synthetic drainage components situated between an upper synthetic turf and a lower impermeable thermoplastic geomembrane liner. For example, as shown in FIGS. 1A and 1B, the series of spaced studs incorporated in LLDPE geomembrane 102 are synthetic drainage components required by the capping system 100 of the '105 patent.

These common characteristics, however, result in several disadvantages. Specifically, since such a conventional synthetic grass capping system requires multiple distinct and separate layers each requiring a distinct and separate installation, extensive labor, equipment and time, and therefore cost, are thus needed to deploy such a system in, for example, permanently closing a reclamation site. Next, since such a conventional synthetic grass capping system relies on heavy sand infill, implementing such a system inevitably requires substantial materials, transportation and site manipulation. Besides, since required sand infill is susceptible to wind and water erosion, such a conventional synthetic grass capping system often requires replenishing and repositioning of the sand infill in order to maintain aesthetic and functional objective, thus incurring higher costs in long-term maintenance. Further, as noted, in addition to basic synthetic turf and thermoplastic geomembrane liners, such a conventional synthetic grass capping system also requires synthetic drainage components. Thus, such a capping system inevitably incurs additional cost associated with manufacturing and incorporating synthetic drainage components in the capping system, thereby increasing overall cost required.

Therefore, there is a need for a capping system that can address the above-discussed issues existed in conventional synthetic grass capping systems exemplified by the one disclosed in the '105 patent.

BRIEF SUMMARY

In one aspect, the present disclosure provides a manufactured true composite having synthetic turf and impermeable geomembrane, which may be made of or substantially made of thermoset material, such as EPDM. Such a composite, when installed in a job site using intermittent earth anchors and overlapping seams, provides impermeable and functional aesthetic cover for land reclamation.

In another aspect, the present disclosure provides a manufacturing process to a manufacture a true composite having synthetic turf and impermeable geomembrane, which, when installed in a job site using intermittent anchoring schemes (such as earth anchors and/or earth trenches) and overlapping seams, provides impermeable and functional aesthetic cover for land reclamation.

In yet another aspect, the present disclosure provides a capping system using a pre-manufactured composite having synthetic turf and impermeable geomembrane to form a permanent impermeable cover of a job site. In particular, the composite is installed on the job site using intermittent anchoring devices (such as earth anchors and/or earth trenches) and overlapping seams. While effectively providing impermeable and functional aesthetic cover for land reclamation, such a capping system, by eliminating separate and distinct layers (such as heavy sand infill and separate synthetic drainage components) otherwise required, substantially reduces the materials, labor, equipment and time, and thus the cost, otherwise needed for land reclamation.

In yet another aspect, the present disclosure provides a manufactured composite having synthetic turf and impermeable geomembrane, with each installation piece of the composite comprising, along a planar dimension, a tufted section and a non-tufted section. The non-tufted section is extended from the tufted section along the planar dimension to one edge of the installation piece and is formed by the primary component of the synthetic turf and the geomembrane but without the synthetic grass component of the synthetic turf. The non-tufted section is used as an impermeable base for anchoring the installation piece securely on top of an area of a job site with one or more optional earth anchors. The non-tufted section also serves as an impermeable base for forming a reinforced overlapping seam with a neighboring installation piece, with the reinforced overlapping seam being used to physically and permanently join the neighboring installation piece to the installation piece so as to extend continuity of synthetic grass as well as continuity of impermeability of the manufactured composite over an area of foundation soil.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2A is an exploded cross section view illustrating the components of the Composite, and FIG. 2B is a cross section view illustrating the manufactured Composite.

DETAILED DESCRIPTION

Figure 1A:
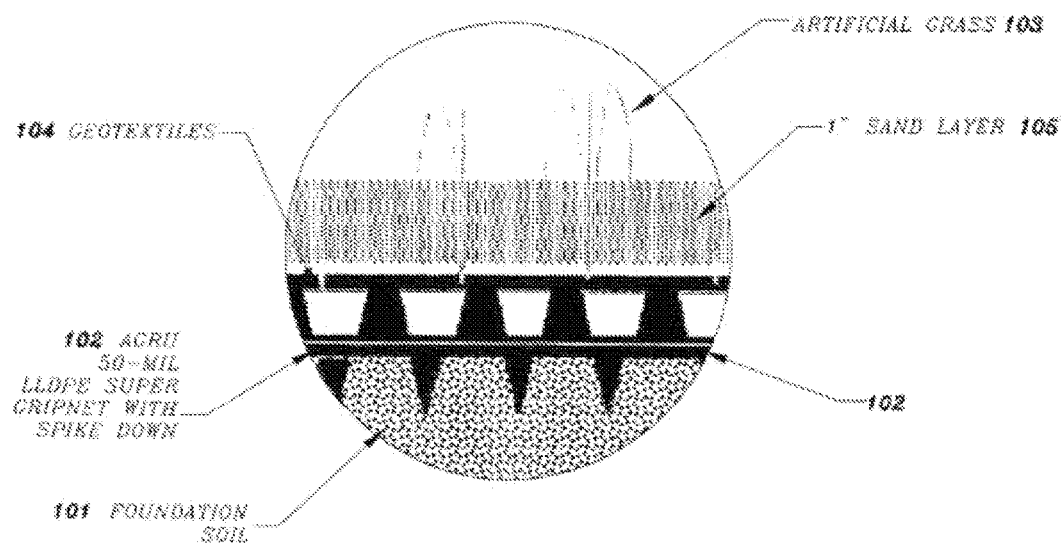
FIGS. 1A-B are cross section views showing an exemplary conventional synthetic grass capping system disclosed in the '105 patent.
Figure 1B:
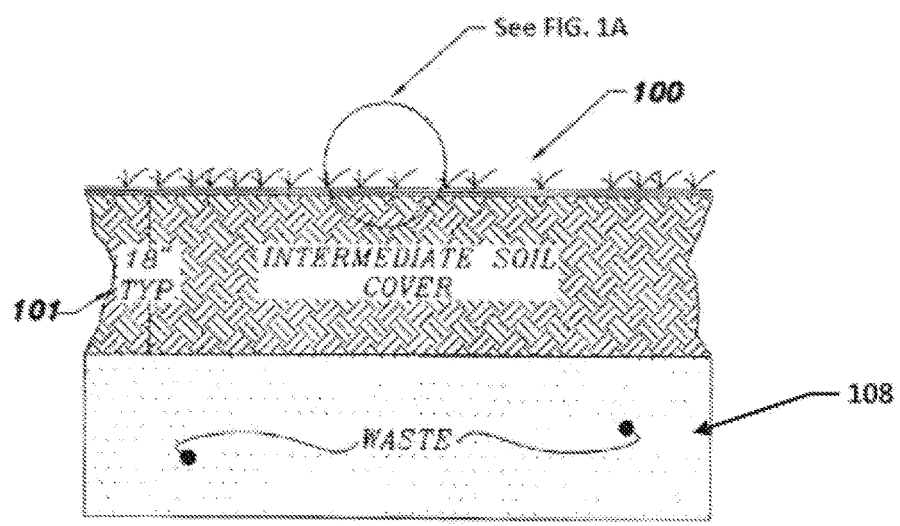

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

The terminology used herein is for the purpose of describing particular embodiments only and is not intended to be limiting of the disclosure. As used herein, the singular forms "a", "an" and "the" are intended to include the plural forms as well, "or" includes "and/or," and reference to a numerical value includes at least that value, unless the context clearly indicates otherwise. Moreover, the use of the terms first, second, etc. do not denote any order or importance, but rather the terms first, second, etc. are used to distinguish one element from another.

Within the descriptions of the different views of the figures, the use of the same reference numerals and/or symbols in different drawings indicates similar or identical items, and similar elements can be provided similar names and reference numerals throughout the figures. If a reference numeral is once used to refer to a plurality of like elements, unless required otherwise by context, the reference numeral may refer to any, a subset of, or all of, the like elements in the figures bearing that reference numeral. The specific identifiers/names and reference numerals assigned to the elements are provided solely to aid in the description and are not meant to imply any limitations (structural or functional or otherwise) on the described embodiments.

In the description, relative terms such as "left," "right," "vertical," "horizontal," "upper," "lower," "top" and "bottom" as well as any derivatives thereof (e.g., "left side," "upper synthetic turf," and etc.) should be construed to refer to the logical orientation as then described or as shown in the drawing figure under discussion. These relative terms are for convenience of description and are not intended to convey any limitation with regard to a particular orientation.

Figure 2A:
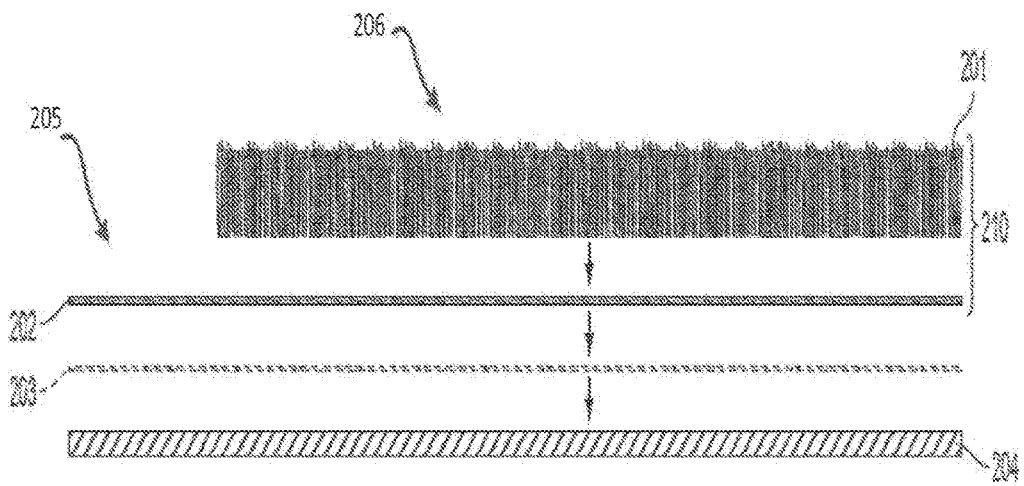
FIGS. 2A-B are cross section views illustrating the components of a manufactured composite having synthetic turf and impermeable geomembrane (hereinafter referred to as "Composite"), according to one or more embodiments of the present disclosure. Specifically.
Figure 2B:
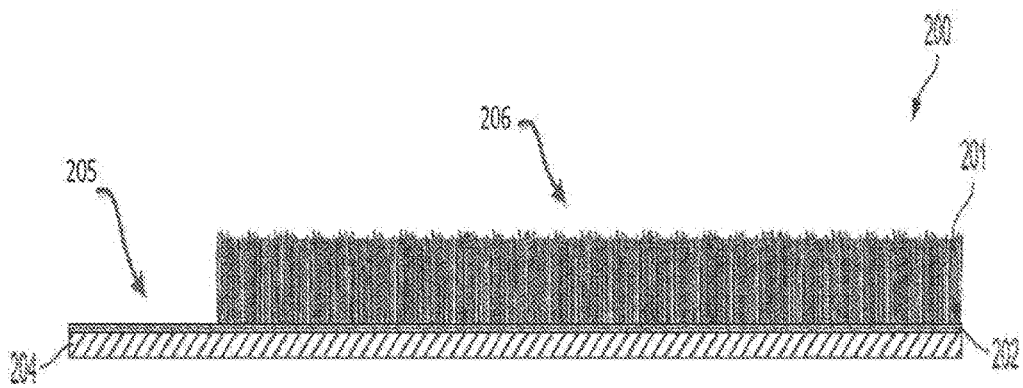

With reference now to the figures, and beginning with FIGS. 2A-B, there are illustrated cross section views illustrating the components of a manufactured composite having synthetic turf and impermeable geomembrane, according to one or more embodiments of the present disclosure.

FIG. 2A is an exploded cross section view illustrating the components of a piece of a composite (hereinafter referred to as "Composite") of synthetic turf and impermeable geomembrane, according to one or more embodiments of the present disclosure. Referring to FIG. 2A, for the most part, from top to bottom, a piece of Composite 200 comprises synthetic turf 210 (which comprises synthetic grass 201 and primary 202), bonding adhesive 203 and impermeable geomembrane 204.

In one embodiment, primary 202 is made of UV resistant woven polypropylene, and synthetic grass 201 is a collection of tufts, such as UV resistant, polyethylene monofilament yarns, with tufts tufted on a narrow gauge into primary 202 to form synthetic turf 210. Optionally, a secondary turf binder (not shown) may be applied to synthetic turf 210 to secure the tufts so that the tufts cannot be easily pulled out by brushing, traffic, or exposure over time. For example, the back of primary 202 may be lightly coated with liquid-applied polyurethane as a secondary turf binder that cures and secures the tufts.

Impermeable geomembrane 204, in one embodiment, is primarily or substantially made of thermoset material impermeable to liquids (such as water), gas (such as air or methane) and solids. For example, geomembrane 204 may be primarily or substantially made of EPDM having a thickness of 45 mil (1.14 mm). This is at least in part due to the consideration that thermoset geomembrane, such as geomembrane made of EPDM, usually has minimal (e.g. less than 1%) expansion and contraction, which is a property desired for maintaining stable bonding to the usually flexible and pliable primary of synthetic turf so as to keep the Composite stable and intact.

Bonding adhesive 203 is used to adhere synthetic turf 210 to geomembrane 204. For illustration purpose, bonding adhesive 203 is shown as a separate layer. In actuality, bonding adhesive 203 may be meshed with both synthetic turf 210 and geomembrane 204 to secure the primary and the tufts of synthetic turf 210 to geomembrane 204 (such as EPDM geomembrane), and thus may not be visible therebetween.

As illustrated in FIG. 2A, the exemplary Composite piece 200 comprises, in addition to a section 206 where there is synthetic grass tufted into primary 202, an edge section 205 where there is no synthetic grass 201 tufted into primary 202 with the bonded and merged combination of untufted primary 202 of synthetic turf 210 and impermeable geomembrane 204 remaining and exposed. Hereinafter, the terms "section" and "area" may be used interchangeably. As illustrated, untufted edge section 205 is, in a length-wise direction, extended from and outside of the neighboring tufted section 206 of Composite piece 200 (hereinafter also referred to as "synthetic grass section"). In one embodiment, the length of edge section 205, in the length-wise direction, may be about or up to 14 inches. Thus, edge section 205 comprises, from top to bottom, primary 202 of synthetic turf 210, bonding adhesive 203, and geomembrane 204. As will be further disclosed, edge section 205 serves as a base for anchoring the Composite piece as well as for forming an impermeable reinforced overlapping seam in joining this Composite piece with another Composite piece.

The bonded and merged combination of primary 202 and geomembrane 204 may be viewed as the base of Composite piece 200 below synthetic grass 201. In one embodiment, impermeable geomembrane 204 has a thickness of 45 mil (or 1.14 mm). The thickness of primary 202 of synthetic turf 210 is usually a minor fraction of the thickness of geomembrane 204. Thus, the base thickness of Composite piece 200 is a little over 45 mil. Typically, the height of synthetic grass 201 of synthetic turf 210 is approximately 36 mm. Hence, in this embodiment, synthetic grass 201 is approximately 25 to 30 times the thickness of the base there-below (which is the thickness of the bonded and merged combination of primary 202 and geomembrane 204). Thus, for Composite piece 200, the thickness of the base below synthetic grass 201 is usually less than 4%, and therefore a small fraction, of the height of synthetic grass 201.

In view of the above-noted exemplary dimensions of components of Composite piece 200, as a skilled artisan appreciates, FIGS. 2-5 are not drawn to scale—particularly, the respective thicknesses of primary 202 and geomembrane 204 are purposely exaggerated and distorted relative to, e.g., the height of synthetic grass 201—in order to make selected features or relationships easier to see and clearly illustrate the principle of selected operations.

As a skilled artisan appreciates, various modifications may be made to the Composite illustrated in FIG. 2A without departing from the scope and spirit of the present disclosure. As one example, other impermeable materials (other than thermoset material), which are suitable for maintaining stable bonding to the primary of synthetic turf by, e.g., having minimal expansion and contraction, may also be selected and used as the material for geomembrane 204. As another example, two or more layers of primary 202, or one or more layers in addition to primary 202 and geomembrane 204, may be used to form the Composite.

FIG. 2B is a cross section view of the same piece of manufactured Composite illustrated in the exploded cross section view of FIG. 2A, according to one or more embodiments of the present disclosure. As illustrated, synthetic turf 210 and geomembrane 204 are merged to form an indivisible piece of manufactured Composite 200. As noted, bonding adhesive 203 is used to bond synthetic turf 210 and geomembrane 204 together. When the Composite is formed, bonding adhesive 203 is usually no longer visible (as bonding adhesive 203 has been meshed into both synthetic turf 210 and geomembrane 204), and thus is not shown in the illustrated manufactured Composite. As also illustrated, edge section 205 of Composite piece 200, which is extended from the neighboring synthetic grass section 206, is a composite section having primary 202 of synthetic turf 210 and geomembrane 204 but with no synthetic grass tufted into primary 202.

Figure 3:
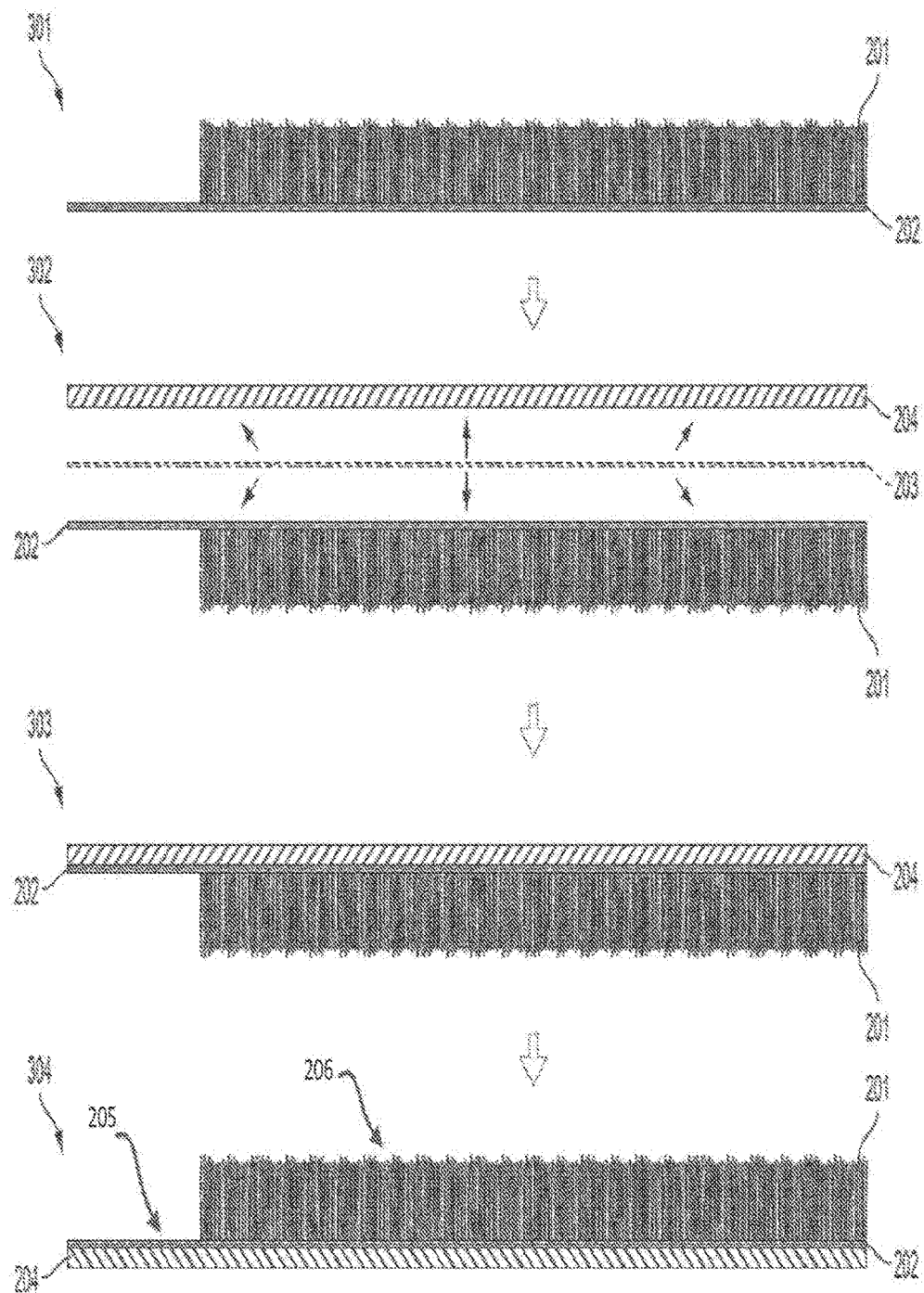
FIG. 3 is flow diagram illustrating an exemplary process used to manufacture the presently disclosed Composite, according to one or more embodiments of the present disclosure.

FIG. 3 is a flow diagram illustrating an exemplary process of manufacturing the Composite, according to one or more embodiments of the present disclosure. Referring to FIG. 3, at step 301, synthetic turf 210 is formed using one or more tufting techniques. In one embodiment where synthetic grass 201 comprises a plurality of yarns and primary 202 is made of woven polypropylene, the yarn material is mounted on creels and fed through a tufter into the polypropylene woven primary. The yarn material is tufted over a width in a width-wise direction without going past one end of the width so that a pre-specified width, such as 14-16 inch, next to the end of the tufted width is left blank with no yarn. This untufted width, which corresponds to the length of edge section 205 in a length-wise direction illustrated in FIGS. 2A and 2B, is reserved as a base to form an overlapping seam via which two Composite pieces are physically joined. Further, the yarn material may be tufted over a pre-specified length, such as several hundred feet, in a length-wise direction. Synthetic turf 210 is formed when the tufting is completed. In one embodiment, synthetic turf 210 is formed in the form of a continuous sheet suitable to be placed and conveyed on a conveyor belt.

At step 302, bonding adhesive 203 is applied to synthetic turf 210, as impermeable geomembrane 204, such as a 45-mil EPDM geomembrane, is positioned to be adhered to the back of primary 202 of synthetic turf 210. In one embodiment, synthetic turf 210, which may be in the form of a sheet, is sent to a laminating factory to be prepared for the application of adhesive directly onto the back or the material of its primary 202. Geomembrane 204 is received at the lamination factory and mounted to be fed parallel to the synthetic turf 210 onto a conveyor belt. Synthetic turf 210, in a face-down orientation with the back of its primary 202 facing up, travels down the conveyor into an applicator frame where bonding adhesive 203, which may be an advanced bonding adhesive such as hot melt adhesive, is applied to the back of its primary 202. Additionally or alternately, bonding adhesive 203 is also applied to the surface of geomembrane 204 facing the back of primary 202 of synthetic turf 210. In one implementation, bonding adhesive is applied to synthetic turf 210 or geomembrane 204 in a predetermined amount per square yard.

At step 303, impermeable geomembrane 204 is merged onto the back of primary 202 of synthetic turf 210 (where bonding adhesive 203 has been applied at step 302). In the same embodiment described above in connection with step 302, synthetic turf 210, which faces down, continues on the conveyor until geomembrane 204 is merged on top of the back of the turfs primary 202 with applied bonding adhesive 203. Geomembrane 204 and synthetic turf 210 are bonded together with applied bonding adhesive 203, and travel through one or more compression means, such as compression rollers. The one or more compression means reinforce the bonding between the two components (namely, the geomembrane 204 and the synthetic turf 201) by compressing the two merged components together under high pressure as the two merged components travel there-through. With step 303, impermeable geomembrane 204, with bonding adhesive 203, is effectively pressed against primary 202 of synthetic turf 210 to form a "tuft bind" of the fibers of yarns of synthetic grass 201.

At step 304, the merged material, which results from the merger of the geomembrane 204 and the synthetic turf 201 at step 303, is subject to a high temperature environment in which the high temperature is adapted to further meld and cure the merged material to form a new Composite comprising synthetic turf 210 and impermeable geomembrane 204. In the same embodiment described above in connection with steps 302 and 303, the merged material winds through large high temperature drums at about 210 F, melding and curing the merged material to form a new Composite comprising synthetic turf 210 and impermeable geomembrane 204.

After the temperature drums, the newly formed Composite, which may be in the form of a continuous sheet, is at the end of the conveyor, where one side (e.g. the non-blank side) of the Composite sheet is trimmed for job site seaming. The Composite sheet may then be rolled onto round cores to a desired length, with the resulting roll being tagged with an appropriate identification. The newly formed Composite is allowed to cool on the roll for a custom period of time (such as 24 hours) and further cure, before being distributed for job site use. At a job site, a Composite sheet may be unrolled from a distribution roll, and then cut across the width thereof into a number of parallel strips for installation, with each parallel strip having a cross section illustrated by FIGS. 2A and 2B.

Figure 4:
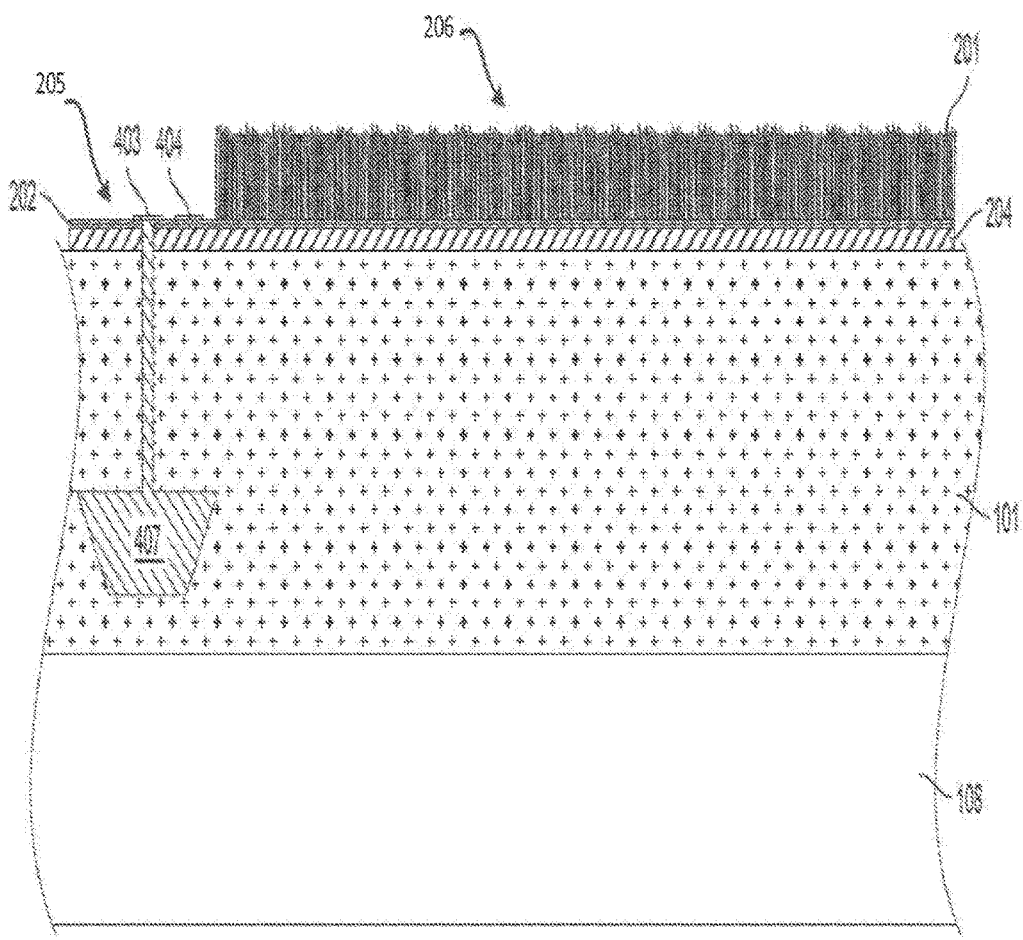
FIG. 4 is a cross section view illustrating a capping system using a piece of the Composite to cap an area of a job site, according to one or more embodiments of the present disclosure.

FIG. 4 is a cross section view illustrating a capping system using a piece of the Composite to cover an area of a job site, according to one or more embodiments of the present disclosure. Referring to FIG. 4, a piece of Composite 200 (hereinafter referred to as "Composite piece 200"), which may be one of the aforementioned parallel strips cut out of an unrolled Composite sheet, is installed to cover an area of the job site by being laid and secured on top of intermediate soil cover 101 (which covers waste 108 situated there-below) otherwise exposed to the environment. In one embodiment, the capping system is installed at a job site having a grade of 0.5% or higher throughout the job site. In another embodiment, intermediate soil cover 101 (foundation soil 101), on which the capping system is placed over, is compacted to between 90% and 95% of Standard Proctor density, either by construction equipment or by mechanical vibrating roller, such that, after compacting, there are no stones larger than 4" minimum protruding. Alternately, if there is an optional gas collection layer (not shown) situated immediately above intermediate soil cover 101, Composite piece 200 is laid and secured on top of the optional gas collection layer.

Composite piece 200, which has been illustrated in FIGS. 2A and 2B, comprises edge section 205 extended from the neighboring synthetic grass section 206 while having no synthetic grass standing above the exposed composite comprising primary 202 of synthetic turf 210 and impermeable geomembrane 204. If used, an anchoring device, such as an earth anchor 407, is vertically installed to anchor Composite piece 200 against intermediate soil cover 101 (also referred to as "foundation soil 101") using edge section 205 of Composite piece 200.

One example of an anchoring scheme using earth anchor 407, which can be suitably configured for use to anchor Composite piece 200 in a capping system, is one commercially available from Platipus Anchors Inc. To install earth anchor 407, in one embodiment, as illustrated, an anchor plate 403 (which may be made from metal, plastic and etc.) is disposed on top of edge section 205 at or near edge section 205's far end, which is one end of Composite piece 200. Earth anchor 407 is driven into intermediate soil cover 101 to an appropriate depth, such that the depth, depending on the job site conditions, is sufficient to result in an expected, or a required minimum, bearing or anchor load capacity achieved through forces (such as frictional and/or gravitational forces) resulting from the soil mass above and surrounding the earth anchor. For example, if it is expected at the job site that a wind uplift factor can reach a maximum 150 miles per hour, then, depending on the job site conditions (such as soil density of foundation soil 101, the slope of a target area, linear friction of the Composite against foundation soil 101, and etc.), earth anchor 407 is driven to a depth such that the bearing capacity achieved by earth anchor 407 as resulted from the depth exceeds the load at which the stress concentration immediately in front of earth anchor 407 as resulted from a wind uplift factor of 150 miles per hour. As a skilled artisan appreciates, although only one earth anchor 407 is illustrated in FIG. 4, multiple earth anchors 407 may be installed to anchor Composite piece 200 against foundation soil 101, with the depth(s) and the spacing(s) of the earth anchors determined based on the job site conditions and the expected (or the required minimum) bearing or anchor load capacity achieved by the earth anchors.

In particular, earth anchor 407 is appropriately disposed within intermediate soil cover 101 and coupled to anchor plate 403 via one or more coupling elements, such as one or more rods, one or more cables, one or more fastening devices (e.g. screws, nuts and etc.), and/or a combination thereof, to achieve load locking. In one implementation, one or more anchor rods are twisted to place and/or expand earth anchor 407 for load locking. A cable coupled to earth anchor 403 is cinched vertically upwards through anchor plate 403 to achieve a desired stress load, and then secured on top of anchor plate 403 via one or more fastening devices, to achieve load locking. The coupling tension between anchor plate 403 and earth anchor 407, as resulted from the load locking, in turn results in anchor plate 403 being securely attached to top of edge section 205.

As a skilled artisan appreciates, the earth anchor scheme illustrated in FIG. 4 is merely exemplary. Various other anchoring schemes or anchoring devices (e.g. using earth trenches) may also be suitably configured for use to securely anchor Composite piece 200 against foundation soil 101 in similar or different forms without departing from the spirit and the scope of the present disclosure. For example, additionally or alternately, earth trenches, as part of an overall anchoring scheme, may be used to anchor the Composite against foundation soil 101. In one implementation, earth trenches of appropriate depths and widths may be dug to lay Composite pieces therein at either non-sloped sites or sloped sites. In particular, impermeable geomembrane 204, which may be made of thermoset material (such as EPDM), usually generates relatively high linear friction against foundation soil 101. Hence, Composite pieces 200, by themselves, generate relatively high linear friction against foundation soil 101 when laid on top of foundation soil 101. Thus, after Composite pieces 200 are laid in the earth trenches, with the dug-out soil deployed across synthetic grass 201 of Composite pieces 200 to weigh down on the Composite pieces, Composite pieces 200 may be secured against foundation soil 101.

Figure 5A:
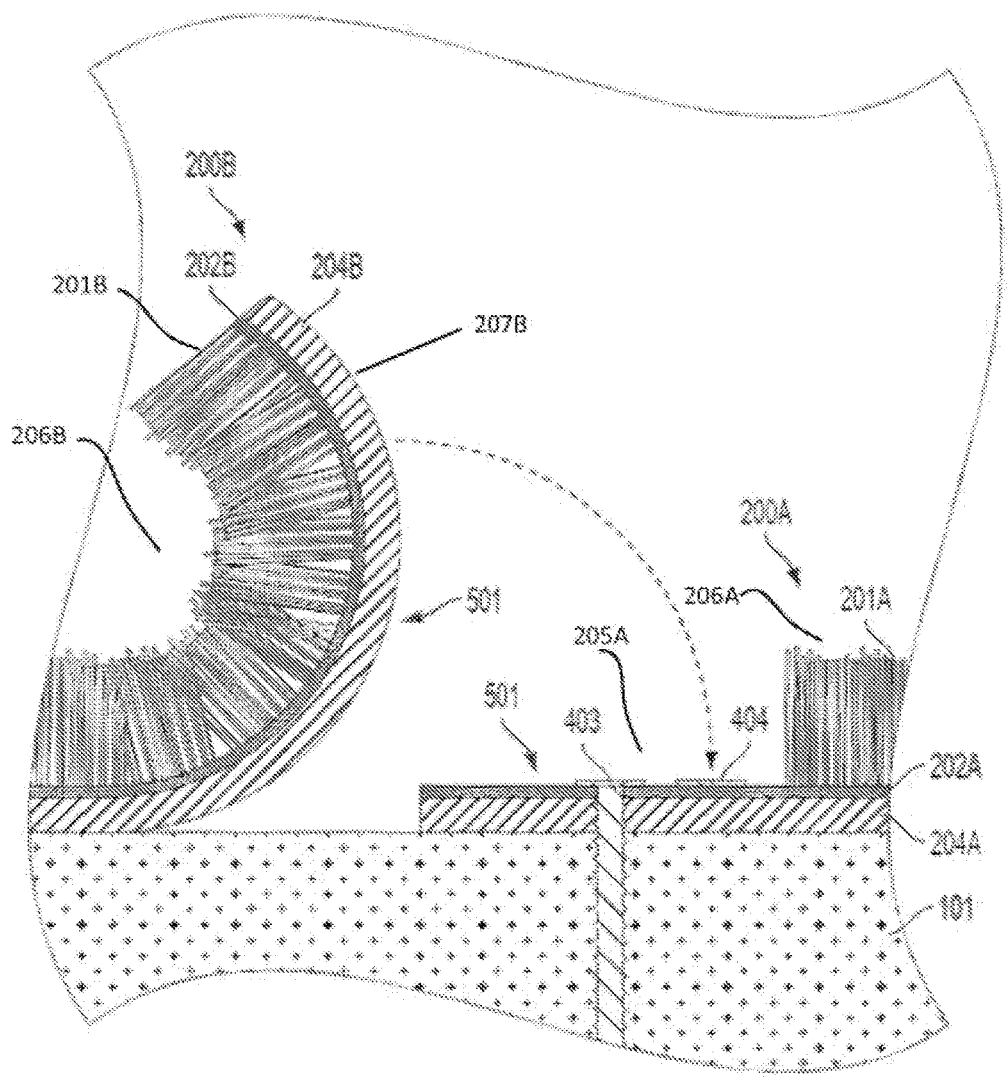
FIGS. 5A-C are cross section views illustrating a process in which two pieces of the Composite are physically and permanently joined together via a reinforced overlapping seam so as to extend and realized continuity of synthetic grass and continuity of impermeability over an area of foundation soil, according to one or more embodiments of the present disclosure.
Figure 5B:
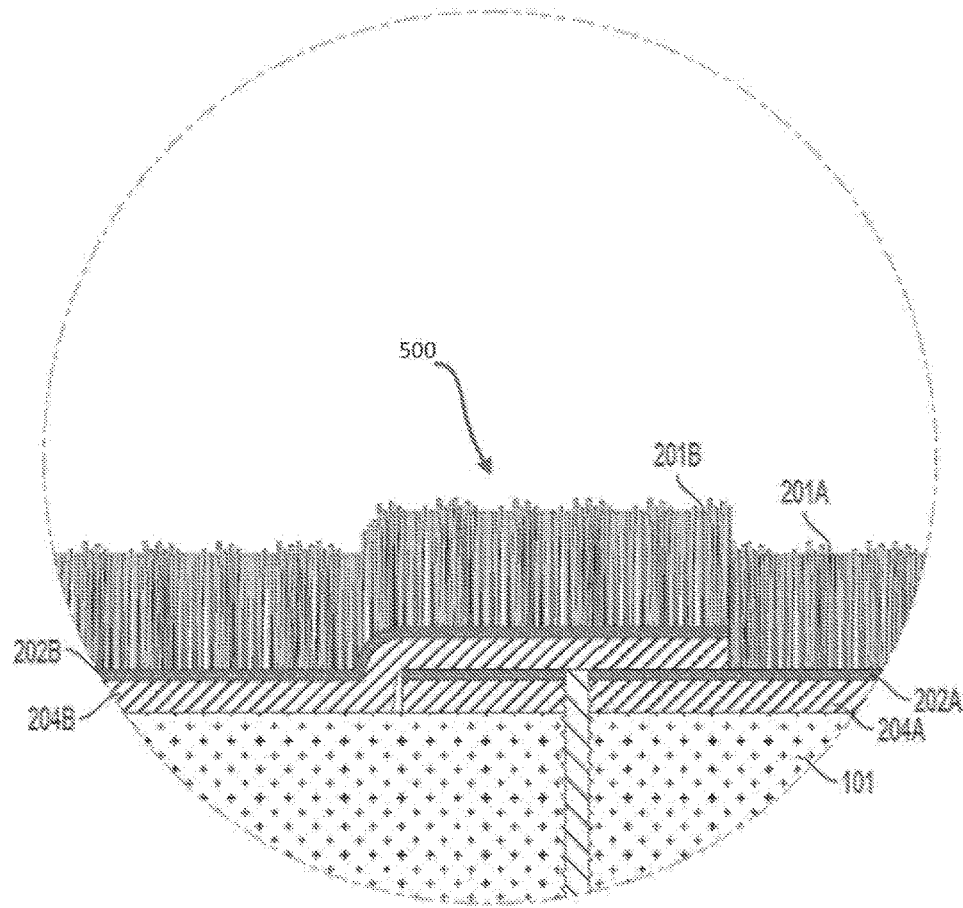
Figure 5C:
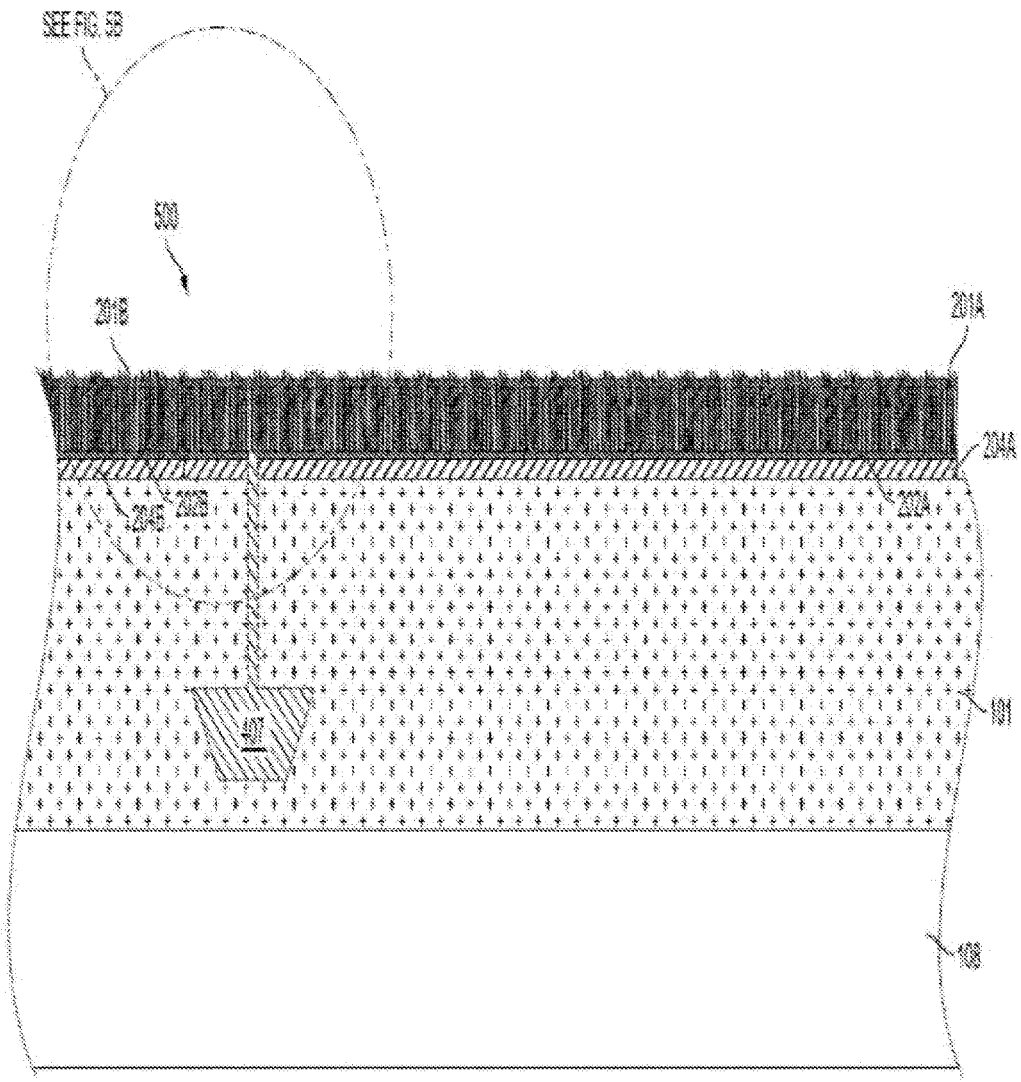

FIGS. 5A-C are cross section views illustrating an exemplary process in which two pieces of Composite are physically and permanently joined together via a reinforced overlapping seam so as to extend aesthetic look of synthetic grass as well as impermeable coverage of the Composite over an area of foundation soil 101, according to one or more embodiments of the present disclosure.

FIG. 5A is an exaggerated cross section view illustrating how a second Composite piece is configured and positioned relative to an already installed first Composite piece before an edge portion of a tufted edge section of the second Composite piece is overlaid onto an untufted edge section of the first Composite piece in order to form a reinforced overlapping seam, according to one or more embodiments of the present disclosure. Referring to FIG. 5A, Composite pieces 200A and 200B, as indicated by their reference numerals, are both a manufactured Composite piece 200 illustrated in FIGS. 2A and 2B. Composite piece 200A has been laid and anchored on top of an area of foundation soil 101 (or gas collection layer), with its synthetic-grass-less edge section 205A extended from the neighboring synthetic grass section 206A and serving as the base for forming an impermeable reinforced overlapping seam. Hereinafter, edge section 205A will be interchangeably referred to as seam base 205A. Composite piece 200B is laid next to edge section 205A of Composite piece 200A in a length-wise direction in such a manner that an edge portion of an edge synthetic grass section 206B of Composite piece 200B can be overlaid on top of seam base 205A. Hereinafter, the edge portion of synthetic grass section 206B will be interchangeably referred to as seam overlay 207B.

Specifically, seam overlay 207B may be defined as the portion of synthetic grass section 206B having, in a lengthwise direction, a starting point at one end of synthetic grass section 206B (which is also one end of Composite piece 200B) and an ending point within synthetic grass section 206B, where the length (or distance) between the starting point and the ending point is approximately equal to the length of seam base 205A of Composite piece 200A in a length-wise direction.

As illustrated in FIG. 5A, Composite piece 200B is lined next to Composite piece 200A such that the ending point of seam overlay 207B is positioned on or slightly next to the far end of seam base 205A of Composite piece 200A. This configuration lets seam overlay 207B to be overlaid on top of and across the entire seam base 205A of Composite piece 200A to form an overlapping seam. The starting point of seam overlay 207B meets or substantially meets the near end of seam base 205A (abutting the neighboring synthetic grass section 206A of Composite piece 200A) when the overlapping seam is formed.

As shown in FIG. 5A, before seam overlay 207B is overlaid on top of seam base 205A, anchor plate 403, as illustrated in FIG. 4, is disposed on and securely attached to top of seam base 205A, as part of an exemplary anchoring scheme used to anchor Composite piece 200A against foundation soil 101. Thus, as illustrated, anchor plate 403 lies underneath seam overlay 207B yet outside of seam base 205A when seam overlay 207B is being overlaid on top of seam base 205A. From another perspective, for the purpose of forming an overlapping seam, the top surface of anchor plate 403 may be treated as part of the top surface of seam base 205A.

As a preparation step for forming an overlapping seam, bonding adhesive 501 may be applied on the top surface of seam base 205A as well as the top surface of anchor plate 403 by, for example, being sprayed or rolled thereon. Additionally or alternately, bonding adhesive 501 may be applied on the underside of seam overlay 207B. After the application of bonding adhesive 501, splicing tape 404 may be applied on the top surface of an area of seam base 205A at or close to seam base 205A's near end (which abuts the neighboring synthetic grass section of Composite piece 200A) by being laid on the top surface of the same area of seam base 205A. Thus, splicing tape 404, being on top of the previously applied bonding adhesive 501, is bonded to the top surface of seam base 205A. Alternately or additionally, a cap strip (not shown) may be applied on the top surface of the aforementioned same area (where splicing tape 404 may be applied) or a nearby area of seam base 205A. Both the splicing tape and the cap strip may be specifically configured to promote a chemical and/or molecular bond to bonding adhesive 501.

FIG. 5B is an exaggerated cross section view illustrating a reinforced overlapping seam formed as a result of seam overlay 207B of Composite piece 200B being overlaid onto seam base 205A of Composite piece 200A, according to one or more embodiments of the present disclosure. Referring to FIG. 5B, seam overlay 207B is overlaid onto seam base 205A to form overlapping seam 500. In one implementation, seam overlay 207B is pressed onto seam base 205A as seam overlay 207B is rolled onto seam base 205A from the far end of seam base 205A using, e.g., a 25+ pound roller with 12 inch in width. As seam overlay 207B is compressed against seam base 205A, seam overlay 207B and seam base 205A are permanently bonded together due to the strong adherence there-between achieved through the combination of bonding adhesive 501 and splicing tape 404. With the permanent bonding between seam overlay 207B and seam base 205A, overlapping seam 500 is formed. Through the resulting overlapping seam 500, Composite piece 200B and Composite piece 200A are physically and permanently joined together.

With Composite pieces 200B and 200A being permanently joined together through overlapping seam 500, Composite piece 200B, in effect, becomes an extension of Composite piece 200A. Specifically, since seam base 205A (which is bare of synthetic grass) is replaced by overlapping seam 500 having synthetic grass 201B tufted on primary 202B, synthetic grass is extended from synthetic grass section 206A of Composite piece 200A to synthetic grass section 206B of Composite piece 200B, thereby extending and realizing continuity of synthetic grass over an area of foundation soil. Further, since overlapping seam 500, in linking two impermeable Composite pieces 200B and 200A, is impermeable itself due to its inclusion of two impermeable geomembranes 204B and 204A, continuity of impermeability is extended and realized over an area of foundation soil.

As illustrated in FIG. 5B, overlapping seam 500, from top to bottom, comprises synthetic grass 201B, primary 202B, geomembrane 204B, primary 202A and geomembrane 204A. Hence, for overlapping seam 500, the base below synthetic grass 201B comprises two primaries (namely, primaries 202B and 202A) and two impermeable geomembranes (namely, geomembranes 204B and 204A), doubling both the number of primary components of synthetic turf and the number of impermeable geomembranes. In one aspect, with the doubling in the number of impermeable geomembranes, overlapping seam 500 is reinforced in impermeability. In another aspect, with the doubling in the number of primary components of synthetic turf, overlapping seam 500 is reinforced in tensile strength. Therefore, the resulting overlapping seam is also referred to as a reinforced overlapping seam in the present disclosure.

FIG. 5C is a cross section view illustrating aesthetic look, from a distance, of two Composite pieces installed using earth anchor 407 and overlapping seam 500 over an area of a job site. As noted in connection with FIGS. 2A and 2B, in an embodiment where the thickness of impermeable geomembrane 204 is 45 mil (1.14 mm) and the height of synthetic grass 201 is 36 mm, the thickness of the base of a Composite piece 200 (below synthetic grass 201) is usually less than 4%, and therefore a small fraction, of the height of synthetic grass 201. Compared to that of a Composite piece 200 (such as Composite piece 200A or 200B), the base thickness of overlapping seam 500 (below synthetic grass 201B) is substantially doubled, e.g., from a little over 45 mil to a little over 90 mil, due to the doubling in both the number of primary components of synthetic turf and the number of geomembranes. However, the doubled base thickness of overlapping seam 500 is still less than 8% of, and therefore remains to be a small fraction of, the height of synthetic grass 201B. Putting it differently, the height of synthetic grass is predominant over both the vertical thickness of the base of a Composite piece 200 and the vertical thickness of the base of an overlapping seam 500. Thus, referring to FIG. 5C, looking, from a distance, at two Composite pieces installed using intermittent earth anchor 407 and overlapping seams 500, the difference in base thickness, or in other words the difference in "horizontal" profile, between overlapping seam 500 and the two neighboring synthetic grass sections of the two Composite pieces is practically unnoticeable below the predominantly tall continuous synthetic grass 201A and 201B.

Accordingly, as Composite pieces 200 are installed using intermittent earth anchors 407 and overlapping seams 500 over foundation soil 101, not only continuity of synthetic grass as well as continuity of impermeability of Composite are extended and realized, aesthetic look of synthetic grass is also extended and materialized. As such, using Composite pieces 200, the presently disclosed capping system is able to provide permanent, impermeable and functional aesthetic cover over an entire job site for land reclamation.

As a skilled artisan appreciates, although FIGS. 5A-5C show an example of overlaying seam overlay 207B of Composite piece 200B on top of seam base 205A of Composite piece 200B where seam overlay 207B is lined on or next to the left side of seam base 205A, a similar overlaying process can be conducted where seam overlay 207B is lined on or next to the right side of seam base 205A when seam base 205A is situated on the right edge of Composite piece 200A. Additionally, Composite piece 200A may be configured as having two seam bases 205A on both left and right sides so that an overlaying process can be conducted on each of the left and right seam bases 205A, thus joining Composite piece 200 to two neighboring Composite pieces via two resulting reinforced overlapping seams 500 formed on two seam bases 205A, respectively.

As a skilled artisan readily appreciates, the approaches used by Applicant are quite distinct from those used in conventional synthetic grass capping systems (such as the one disclosed in the '105 patent).

First, one approach of Applicant is abandoning and avoiding using separate and distinct installation layers in a capping system. In doing so, Applicant investigated the possibility of combining synthetic turf and impermeable geomembrane into a true pre-manufactured composite effective to be used in a single-layer installation capping system as the single layer of a permanent, impermeable and functional aesthetic cover for land reclamation. By contrast, conventional synthetic grass capping systems, such as the one disclosed in the '105 patent, center on using separate and distinct installation layers, such as synthetic turf, sand-infill, synthetic drainage components and impermeable geomembrane, for land reclamation.

Next, Applicant, in one embodiment of the present disclosure, chooses the relatively more expensive thermoset geomembrane, such as geomembrane made of EPDM, to achieve impermeability required in a capping system so that a true composite including synthetic turf and impermeable geomembrane can be feasibly manufactured for use as the single layer of a permanent, impermeable and functional aesthetic cover in a capping system. By contrast, although thermoset geomembrane, such as geomembrane made of EPDM, has long been available, conventional synthetic grass capping systems have deliberately avoided using the relatively more expensive thermoset geomembrane, and instead uniformly chosen the relatively less expensive thermoplastic geomembrane, such as HDPE or LLDPE, to achieve impermeability required therein.

More specifically, thermoset geomembrane, such as EPDM, does not oxidize, whereas thermoplastic geomembrane, such as HDPE or LLDPE, does. As a result, thermoset geomembrane usually has very minimal (such as less than 1%) expansion and contraction, whereas thermoplastic geomembrane usually has substantial expansion and contraction. Thus, if thermoplastic geomembrane were included in a composite (with synthetic turf), its tendency to expand and contract would inevitably cause the composite to de-laminate and result in a capping system (using the composite) unstable, regardless of how strong the adhesive used to adhere the primary of synthetic turf and thermoplastic geomembrane is. On the other hand, using thermoset geomembrane, such as EPDM, as impermeable geomembrane included in a composite, due to the minimum tendency to expand and contract of thermoset geomembrane, does not cause the composite to de-laminate and thus renders a capping system (using the composite) balanced and stable.

Thus, the conventional approach of exclusively relying on the relatively less expensive thermoplastic geomembrane to achieve impermeability prevents ordinarily skilled artisans implementing conventional synthetic grass capping systems from moving away from using thermoplastic geomembrane as a separate impermeable layer in a capping system. By contrast, choosing the relatively more expensive thermoset geomembrane to achieve impermeability allows Applicant to effectively materialize true pre-manufactured composite (comprising synthetic turf and impermeable geomembrane) that can be used in a viable single-layer-installation capping system, thereby achieving substantial savings (over conventional synthetic grass capping systems) by eliminating or reducing costs associated with materials (such as sand-infill), labor, equipment and time otherwise required. Accordingly, Applicant's approach, in one embodiment of the present disclosure, of selecting thermoset geomembrane to achieve impermeability is vitally distinct from the conventional approach of exclusively relying on thermoplastic geomembrane to achieve impermeability.

Accordingly, it should be apparent to a skilled artisan that the approaches used by Applicant are quite distinct from those used in conventional synthetic grass capping systems.

By moving away from the approaches of conventional synthetic grass capping systems, the presently disclosed capping system manages to achieve numerous advantages over conventional synthetic grass capping systems. First, rather than requiring separate installations for multiple separate and distinct layers, the presently disclosed capping system only uses a single layer (namely, the Composite) to cover foundation soil, and thus only requires a single-layer installation, as illustrated in FIGS. 4-5. As a result, substantial cost associated with materials, equipment, transportation and site manipulation in connection with installations of multiple separate and distinct layers is eliminated or reduced. Consequently, the workload and the time otherwise needed for installation may be drastically reduced.

Second, unlike a conventional synthetic grass capping system (such as the one disclosed in the '105 patent), the presently disclosed capping system does not require heavy sand-infill, which is susceptible to wind and water erosion, to protect the system against wind uplift. This is at least in part due to the uses of anchoring devices, such as intermittent earth anchors, and in part due to the consideration that impermeable geomembrane 204, which may be made of thermoset material (such as EPDM), usually generates relatively high linear friction against foundation soil 101, especially when Composite pieces are installed on a slope. Thus, for the presently disclosed capping system, with no need for sand-infill, expensive maintenance work resulting from, e.g., wind and water erosion to sand infill otherwise needed is also eliminated.

Third, for the presently disclosed capping system, the surface of the used Composite promotes rapid drainage. For example, when the Composite is installed at a job site having a grade of 0.5% or higher grade throughout the job site, outside moisture landing on synthetic grass runs with the slope of the grade directly into a collector system. Thus, the presently disclosed capping system does not require synthetic drainage components, such as the series of studs incorporated in the LLDPE geomembrane 102 as disclosed in the '105 patent. As a result, cost associated with manufacturing and incorporating synthetic drainage components (into a capping system) otherwise needed is eliminated.

Fourth, for the presently disclosed capping system, as illustrated in FIG. 3, impermeable geomembrane 204, with adhesive, is pressed against primary 202 of synthetic turf 210, which is the back of the synthetic grass 201 of synthetic turf 210, to form a "tuft bind" of the fibers of yarns of synthetic grass 201. By contrast, conventional synthetic grass capping systems (such as the one disclosed in the '105 patent) usually do not have any "tuft bind", and therefore is susceptible to its synthetic grass being forcibly separated from the back thereof by external influences, e.g., a bird. Thus, having the "tuft bind" for the Composite is another advantage that the presently disclosed capping system has over conventional synthetic grass capping systems.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the appended claims.

What is claimed is:

1. A synthetic turf composite structure, comprising:
a synthetic turf including synthetic grass and a permeable primary, wherein the synthetic turf includes a tufted section having the synthetic grass tufted into the permeable primary and an untufted section without the synthetic grass tufted into the permeable primary, wherein an upper end portion of the synthetic grass extends above a first side of the permeable primary and a lower end portion of the synthetic grass extends through the permeable primary to expose the lower end portion of the synthetic grass at a second side of the permeable primary and wherein the untufted section extends from the tufted section to an edge of the permeable primary;
an impermeable geomembrane having an upper side and a lower side, wherein the impermeable geomembrane underlies the second side of the permeable primary at said tufted and untufted sections thereof, wherein the lower end portion of the synthetic grass terminates within a space defined between the upper side of the impermeable geomembrane and the second side of the permeable primary;
a first layer of bonding material between the permeable primary of the synthetic turf and the impermeable geomembrane adjoining the tufted and untufted sections of the synthetic turf with the impermeable geomembrane such that the synthetic turf and the impermeable geomembrane are bonded together to form a composite structure; and
a second layer of bonding material on at least a portion of the first side of the permeable primary along a length of the untufted section of the synthetic turf between the tufted section and the first length-wise edge of the permeable primary.

2. The synthetic turf composite structure of claim 1 wherein the impermeable geomembrane is one of made of thermoset material and thermoplastic material.

3. The synthetic turf composite structure of claim 1 wherein the impermeable geomembrane is one of made of EPDM and substantially made of EPDM.

4. The synthetic turf composite structure of claim 1 wherein the permeable primary of the synthetic turf is made of woven polymeric material.

5. The synthetic turf composite structure of claim 1 wherein the first layer of bonding material and the geomembrane each extend across a border between the tufted and untufted sections.

6. A landfill site, comprising:
an area of land having an exposed surface;
a plurality of pieces of synthetic turf composite structure arranged in a side-by-side manner covering at least a portion of the exposed surface of the area of land, wherein each one of the pieces of synthetic turf composite structure comprises:
a synthetic turf including synthetic grass and a permeable primary, wherein the synthetic turf includes a tufted section having the synthetic grass tufted into the permeable primary and an untufted section without the synthetic grass tufted into the permeable primary, wherein an upper end portion of the synthetic grass extends above a first side of the permeable primary and a lower end portion of the synthetic grass extends through the permeable primary to expose the lower end portion of the synthetic grass at a second side of the permeable primary and wherein the untufted section extends from the tufted section to an edge of the permeable primary;
an impermeable geomembrane having an upper side and a lower side, wherein the impermeable geomembrane underlies the second side of the permeable primary at said tufted and untufted sections thereof, wherein the lower end portion of the synthetic grass terminates within a space defined between the upper side of the impermeable geomembrane and the second side of the permeable primary;
a first layer of bonding material between the permeable primary of the synthetic turf and the impermeable geomembrane adjoining the tufted and untufted sections of the synthetic turf with the impermeable geomembrane such that the synthetic turf and the impermeable geomembrane are bonded together to form a composite structure;
a second layer of bonding material on at least a portion of the first side of the permeable primary along a length of the untufted section of the synthetic turf between the tufted section and the first length-wise edge of the permeable primary; and
a plurality of anchoring devices each securely anchoring at least one of the pieces of synthetic turf composite structure to the land.

7. The landfill site of claim 6 wherein the impermeable geomembrane is one of made of thermoset material and thermoplastic material.

8. The landfill site of claim 6 wherein the impermeable geomembrane is one of made of EPDM and substantially made of EPDM.

9. The landfill site of claim 6 wherein the permeable primary of the synthetic turf of the composite is made of woven polymeric material.

10. The landfill site of claim 6, wherein:
each one of the anchoring devices comprises at least one earth anchor having a lower end portion thereof engaged with the land;
the impermeable geomembrane and the permeable primary jointly define an impermeable base of the synthetic turf composite structure; and
each anchoring device extends through the impermeable base within the untufted section of a respective one of said pieces of the synthetic turf composite structure.

11. The landfill site of claim 10 wherein the first layer of bonding material and the geomembrane each extend across a border between the tufted and untufted sections.

12. The landfill site of claim 6 wherein the first layer of bonding material and the geomembrane each extend across a border between the tufted and untufted sections.

13. The landfill site of claim 6 wherein:
the untufted section of a first one of the pieces of synthetic turf composite structure is used as a seam base to form an overlapping seam through which a second one of the pieces of synthetic turf composite structure is physically and permanently joined to the first one of the pieces of synthetic turf composite structure;

the overlapping seam comprising the synthetic grass, the permeable primary and the impermeable geomembrane of an edge portion of a tufted section of the second one of the pieces of synthetic turf composite structure and comprising the permeable primary and the impermeable geomembrane of the untufted section of the first one of the pieces of synthetic turf composite structure; and the edge portion of the tufted section of the second one of the pieces of synthetic turf composite structure is bonded to the untufted section of the first composite piece by the second layer of bonding material.

14. The landfill site of claim 6 wherein the first layer of bonding material and the geomembrane each extend across a border between the tufted and untufted sections.

15. A method of making a composite used for covering foundation soil of a job site for land reclamation, the method comprising:

providing a piece of synthetic turf including a permeable primary and synthetic grass, wherein the synthetic turf includes a tufted section having the synthetic grass tufted into the permeable primary and an untufted section without the synthetic grass tufted into the permeable primary, wherein an upper end portion of the synthetic grass extends above a first side of the permeable primary and a lower end portion extends through the permeable primary to expose the lower end portion of the synthetic grass at a second side of the permeable primary, wherein the untufted section extends from the tufted section to an edge of the permeable primary, wherein the lower end portion of the synthetic grass terminates at the second side of the permeable primary and wherein a first layer of bonding material on at least a portion of the first side of the permeable primary along a length of the untufted section of the synthetic turf between the tufted section and the first length-wise edge of the permeable primary;

providing a piece of impermeable geomembrane having an upper side and a lower side; and adjoining the synthetic turf and the impermeable geomembrane by engaging the second side of the permeable primary with a second layer of bonding material and engaging the upper side of the impermeable geomembrane with the second layer of bonding material such that the permeable primary and the impermeable geomembrane are bonded together by the second layer of bonding material, wherein adjoining the synthetic turf and the impermeable geomembrane includes positioning the piece of impermeable geomembrane adjacent to the piece of synthetic turf such that the lower end portion of the synthetic grass is captured within a space defined between the upper side of the impermeable geomembrane and the second side of the permeable primary.

16. The method of claim 15 wherein adjoining the synthetic turf and the impermeable geomembrane includes:

bringing the impermeable geomembrane into contact with the permeable primary applying heat to at least one of the impermeable geomembrane and the synthetic turf.

17. The method of claim 15 wherein adjoining the synthetic turf and the impermeable geomembrane includes:

applying the second layer of bonding material onto the second side of the permeable primary;

bringing the impermeable geomembrane into contact with the bonding material after applying the second layer of bonding material;

applying heat to the composite after bringing the impermeable geomembrane into contact with the second layer of bonding material; and applying a compressive force onto the composite after applying heat thereto.

18. The method of claim 15 wherein adjoining the synthetic turf and the impermeable geomembrane causes the second layer of bonding material to bind the end portion of at least a portion of the synthetic grass against and into engagement with the permeable primary.

\* \* \* \* \*